United States Patent
Cherbis et al.

(10) Patent No.: US 8,358,829 B2
(45) Date of Patent: Jan. 22, 2013

(54) SYSTEM AND A METHOD FOR INSPECTING AN OBJECT

(75) Inventors: Yosi Cherbis, Haifa (IL); Benny Harel, Kiryat-Haim (IL)

(73) Assignee: Camtek LTD., Migdal Haemek, IL (US)

( * ) Notice: Subject to any disclaimer, the term of this patent is extended or adjusted under 35 U.S.C. 154(b) by 553 days.

(21) Appl. No.: 12/626,636

(22) Filed: Nov. 26, 2009

(65) Prior Publication Data

US 2010/0128968 A1 May 27, 2010

Related U.S. Application Data (60) Provisional application No. 61/117,963, filed on Nov. 26, 2008.

(51) Int. Cl.
*G06K 9/00* (2006.01)
(52) U.S. Cl. .................................. 382/141; 356/237.4
(58) Field of Classification Search .......... 382/138–154; 356/237.1–237.5
See application file for complete search history.

(56) References Cited

U.S. PATENT DOCUMENTS

| | | | |
|---|---|---|---|
| 6,465,801 B1 * | 10/2002 | Gann et al. | 250/559.4 |
| 2004/0096118 A1 * | 5/2004 | Liang | 382/284 |
| 2012/0018925 A1 * | 1/2012 | Schmidt et al. | 264/408 |

* cited by examiner

*Primary Examiner* — Hoa Pham
(74) *Attorney, Agent, or Firm* — Oren Reches (57) ABSTRACT

An inspection method and an inspection system, the inspection system includes: (i) a first group of sensors, for sensing light components of a first light band of an image of an area of an inspected object, and for generating first detection signals reflecting sensed light components of the first light band; (ii) a second group of sensors, for sensing light components of a second light band of the image of the area of the inspected object, wherein the second light band differs from the first light band, and for generating second detection signals reflecting sensed light components of the second light band; (iii) optics, for projecting the image of the area of the inspected object towards the first group of sensors and towards the second array of sensors; and (iv) a processing unit, coupled to the first and second group of sensors, for detecting defects based on the first or second detection signals.

22 Claims, 5 Drawing Sheets

610 receiving from an external camera first image information and second image information, wherein the first image information pertains to a first image that is an image comprising color information of a first band of an optical spectrum and the second image information pertains to a second image that is an image comprising color information of a second band of the optical spectrum, wherein the first image and the second image cover substantially the same area 620 processing the first image information so as to detect first type defects and processing the second image information so as to detect second type defects 630 generating a defect alert and/or a defect report, in response to results of the processing of the different images

| 132 | 142 | 132 | 142 | 132 | 142 | 132 | 142 |
| --- | --- | --- | --- | --- | --- | --- | --- |
| 142 | 132 | 142 | 132 | 142 | 132 | 142 | 132 |
| 132 | 142 | 132 | 142 | 132 | 142 | 132 | 142 |
| 142 | 132 | 142 | 132 | 142 | 132 | 142 | 132 |
| 132 | 142 | 132 | 142 | 132 | 142 | 132 | 142 |
| 142 | 132 | 142 | 132 | 142 | 132 | 142 | 132 |
| 132 | 142 | 132 | 142 | 132 | 142 | 132 | 142 |
| 142 | 132 | 142 | 132 | 142 | 132 | 142 | 132 |

1300

| 132 | 132 | 132 | 132 | 132 | 132 | 132 | 132 |
| --- | --- | --- | --- | --- | --- | --- | --- |
| 142 | 142 | 142 | 142 | 142 | 142 | 142 | 142 |
| 132 | 132 | 132 | 132 | 132 | 132 | 132 | 132 |
| 142 | 142 | 142 | 142 | 142 | 142 | 142 | 142 |
| 132 | 132 | 132 | 132 | 132 | 132 | 132 | 132 |
| 142 | 142 | 142 | 142 | 142 | 142 | 142 | 142 |
| 132 | 132 | 132 | 132 | 132 | 132 | 132 | 132 |
| 142 | 142 | 142 | 142 | 142 | 142 | 142 | 142 |

…
SYSTEM AND A METHOD FOR INSPECTING AN OBJECT

RELATED APPLICATIONS

This patent application claims the priority of U.S. Provisional Patent application Ser. No. 61/117,963, filing date Nov. 26, 2008, which is incorporated herein by its entirety.

BACKGROUND OF THE INVENTION

When scanning electronic circuit (such as printed circuit board and integrated circuits), different color filtering may be required to detect different types of defects. However, using one or more cameras to acquire multiple images (using different filters and/or different lighting) of the same circuit is a slow technical process, which slows down scanning procedures. Using two or more cameras and two or more lighting systems is high cost.

SUMMARY

According to an embodiment of the invention an inspection system is provided. The inspection system can include: (i) a first group of sensors, for sensing light components of a first light band of an image of an area of an inspected object, and for generating first detection signals reflecting sensed light components of the first light band; (ii) a second group of sensors, for sensing light components of a second light band of the image of the area of the inspected object, wherein the second light band differs from the first light band, and for generating second detection signals reflecting sensed light components of the second light band; wherein the second group of sensors is arranged to sense the light components of the second light band while the first group of sensors sense the light components of the first light band, (iii) optics, for projecting the image of the area of the inspected object towards the first group of sensors and towards the second array of sensors; and (iv) a processing unit, coupled to the first and second group of sensors, for detecting defects based on the first or second detection signals.

The processing unit can be arranged to detect a first type of defects based on the first detection signals and can be arranged to detect a second type of defects based on the second detection signals.

The processing unit can be arranged to correlate between the first and second detection signals.

The sensors of the first group of sensors can be arranged to detect red light components and sensors of the second group of sensors can be arranged to detect green light components.

The processing unit can be arranged to detect defects in metal components of the inspected object by processing the first detection signals to detect, and can be arranged to detect defects in a solder mask by processing the second detection signals.

The sensors of the first group of sensors can be arranged to detect infra red light components and sensors of the second group of sensors can be arranged to detect visible light components.

The first and second groups of sensors can be arranged in an interlacing manner.

The first and second groups of sensors can be spaced apart from each other.

The first group of sensors comprises pixel sensors of a first type that can differ from a second type of pixel sensors of the second group of pixels.

The first group of sensors can be preceded by a first filter that filters light components of the first light band. The second group of sensors can be preceded by a second filter that filters light components of the second light band.

The first and second groups of sensors can be arranged to generate the first and second detection signals in parallel and wherein the processing unit can be arranged to generate process the first and second detection signals in parallel.

The processing unit can be arranged to receive the first or second detection signals over a wireless link.

The inspected object can be a printed circuit board.

The inspection system can include a stage for moving the inspected object in relation to the optics so that the optics projects, at different point in time, different images of different area of the inspected object towards the first and second groups of sensors.

According to an embodiment of the invention an inspection system is provided. The inspection system can include: (i) an interface, for receiving first detection signals and second detection signals, wherein the first detection signals are generated by first group of sensors and represent light components of a first light band of an image of an area of an inspected object, wherein the second detection signals are generated by second group of sensors and represent light components of a second light band of the image of the area of the inspected object; and (ii) a processing unit, coupled to the interface, for detecting defects based on the first or second detection signals.

According to an embodiment of the invention a method for inspecting an object is provided, the method includes: (i) projecting an image of an area of the inspected object towards a first group of sensors and towards a second array of sensors; (ii) sensing, by the first group of sensors, light components of a first light band of the image of the area of the inspected object; (iii) generating, by the first group of sensors, first detection signals that reflect sensed light components of the first light band; (iv) sensing, by a second group of sensors and in parallel to the sensing by the first group of sensors (of the light components of the first light band), light components of a second light band of an image of an area of an inspected object; (v) generating, by the second group of sensors, second detection signals that reflect sensed light components of the second light band; and (vi) detecting defects, by a processing unit, based on the first or second detection signals.

The method can include detecting a first type of defects based on the first detection signals, and detecting a second type of defects based on the second detection signals.

The method can include correlating between the first and second detection signals.

The method can include detecting by the sensors of the first group of sensors red light components, and detecting by the sensors of the second group of sensors green light components.

The method can include detecting defects in metal components of the inspected object by processing the first detection signals, and detecting defects in a solder mask by processing the second detection signals.

The method can include sensing by the sensors of the first group of sensors infra red light components, and sensing by the sensors of the second group of sensors visible light components.

According to an embodiment of the invention a method for inspecting an object is provided, the method includes: (i) receiving first detection signals and second detection signals; wherein the first detection signals are generated by first group of sensors and represent light components of a first light band of an image of an area of an inspected object; wherein the second detection signals are generated by second group of sensors and represent light components of a second light band of the image of the area of the inspected object; and (ii) detecting defects based on the first or second detection signals.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE DRAWINGS

The foregoing and other objects, features, and advantages of the present invention will become more apparent from the following detailed description when taken in conjunction with the accompanying drawings. In the drawings, similar reference characters denote similar elements throughout the different views.

Figure 1:
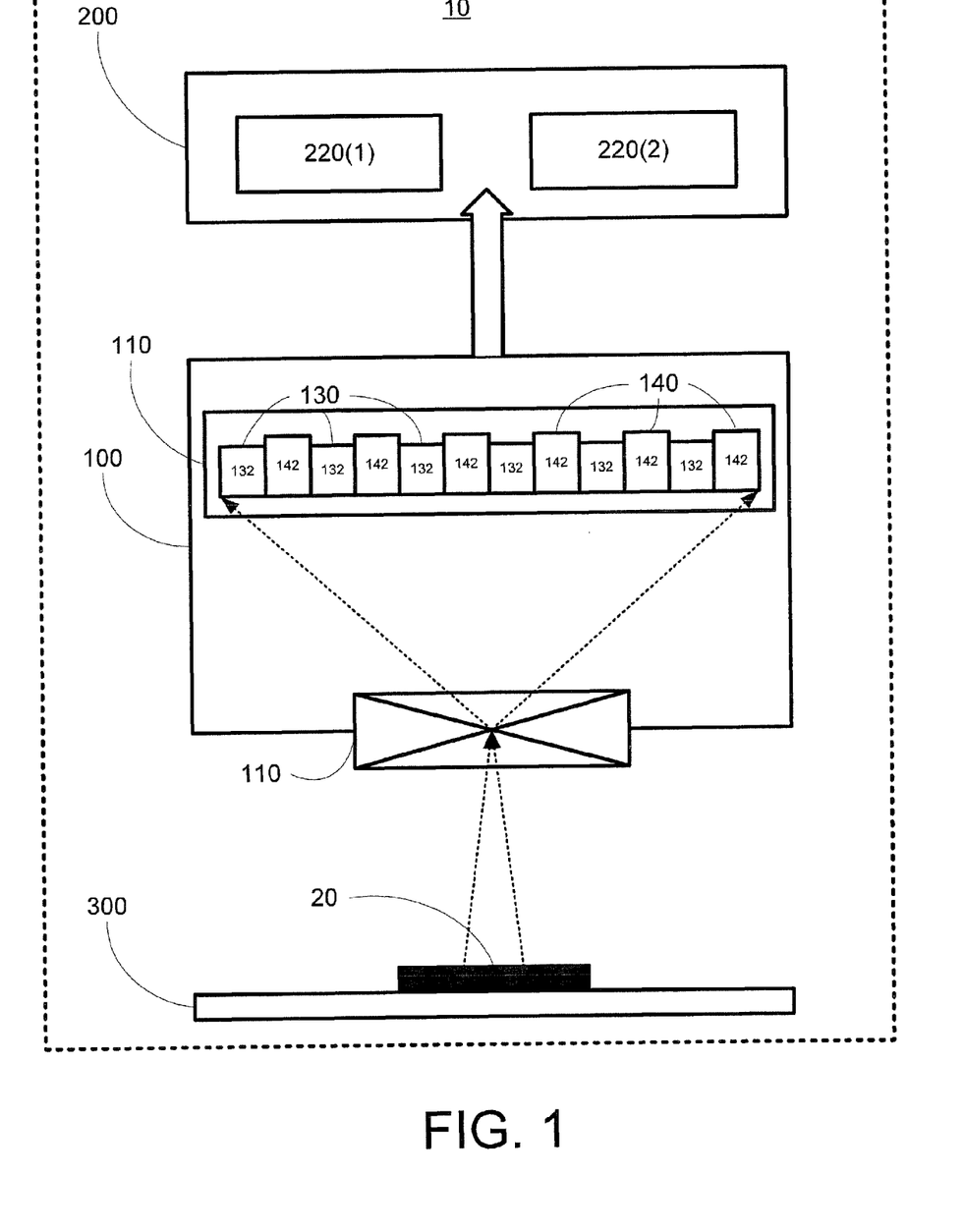
FIG. 1 illustrates a system for inspecting an object, according to an embodiment of the invention.

FIG. 1 illustrates system 10 for inspecting an object, according to an embodiment of the invention.

System 10 includes camera 100 that includes optical section 110 for projecting an image of an object such as inspected electronic circuit 20 (that can be a Printed Circuit Board) onto electronic detector 120, wherein electronic detector 120 includes at least a first group of sensors 130 (that includes at least one first type pixel sensors 132 for the capturing of light signals of a first band of an optical spectrum), and a second group of sensors 140 (that includes at least one second type pixel sensors 142 for the capturing of light signals of a second band of the optical spectrum). It is noted that the pixels sensors of both the first and second groups of sensors 130 and 140 are conveniently adapted to acquire light signals substantially parallelly (i.e. at least partly concurrently). The pixel sensors can be elements of a sensor array.

The object can be imaged, one area after the other, by a multiple iteration process. During each of these iterations an area of the inspected image is illuminated and an image of that area is projected to the first and second groups of sensors.

Each of the first and second groups of sensors can receive the same image but this is not necessarily so. For example, adjacent sensors can receive adjacent portions of the same image. The former can occur when each area is illuminated once while the latter can occur when the same area pixels are illuminated (and light is sensed) more than once. If, for example, the area is scanned then the sensors of the different groups will eventually receive light from the entire area.

Each sensor is arranged to sense light components and to generate detection signals that represents the sensed light components. The detection signals can be analog signals, digital signals, gray level signals, and the like. The detection signals can be stored in memory units and fed to a processing unit.

It is noted that the optical spectrum may be limited to the visible optical spectrum, or may extend to other parts of the optical spectrum, such as infra red.

The first and the second band may be referred to as a color (e.g. red light, green light), but this is not necessarily so. Further more, each of the types of pixel sensors may be adapted to detect light substantially from the respective band of the optical spectrum, or alternatively, the light arriving from the optical section (optics) 110 may be filtered before arriving to different pixel sensors (e.g. red filters will filter light that is directed to red band pixel sensors, and so forth).

System 10 further include a processing unit 200 for processing first image information that is received from camera 100, and second image information that is received from camera 100, wherein first image information pertains to image information of a first image which is respective to light signals detected by first type pixel sensors 132, and second image information pertains to image information of a second image which is respective to light signals detected by second type pixel sensors 142, wherein the first image and the second images are images of substantially the same area.

The processing unit 200 can correlate between the detection signals received from both groups of sensors and detect defects. At least some defects may be detected only if they appear in detection signals from both groups of sensors.

It is noted that processing unit 200 may be connected to camera 100 according to different embodiments of the invention either wirelessly or via cables, and that the connection may involve one or more intermediate units (which may and may not manipulate the transferred image information).

Processing unit 200 is configured to process first image information so as to detect first type defects, and to process second image information so as to detect second type defects, wherein it is noted that, according to different embodiments of the invention, each type of image information may be used to detect more than a single type of defect. For example, in printed circuit boards (PCB), a red image information may be processed to detect defects in metal components (e.g. copper, gold), and a green or white image information may be processed to detect defects in a solder mask, and to evaluate coverage. It is noted that system 10 may be used for detecting defects in different types of electronic circuits 20, such as PCBs, integrated circuits, and so forth. It is noted that processing unit 200 may include one or more processors 220 for the processing of image information.

It is noted that system 10 may be used as an automatic final inspection, carrying out a last stage in a process of inspection. System 10 may be used as an automated optical inspection system.

According to an embodiment of the invention, system 10 (and especially processing unit 200) may be configured to generate a defect alert and/or a defect report, in response to results of the processing of the different images.

It is noted that electronic detector 120 may further include at least one additional group of sensors that includes at least one pixel sensor for the capturing of light signals of another band of an optical spectrum. For example, a third group of sensors may include pixel sensors for the capturing of a green portion of the spectrum.

It is noted that, according to an embodiment of the invention, camera 100 is an RGB camera. According to an embodiment of the invention, camera 100 is a CMOS (Complementary Metal Oxide Semiconductor) camera. According to an embodiment of the invention, camera 100 is a three line CCD (Charge-coupled device) camera.

According to an embodiment of the invention, processing unit 200 includes one or more processors 220 that are adapted to parallelly process image information of the first image and of the second image.

According to an embodiment of the invention, system 10 further includes inspection surface 300, that is adapted to support the electronic circuit 20 during the scanning process. According to an embodiment of the invention, system 10 is adapted to transfer the scanned electronic circuit 20 to another machine or location, in response to a result of the processing.

Figure 2:
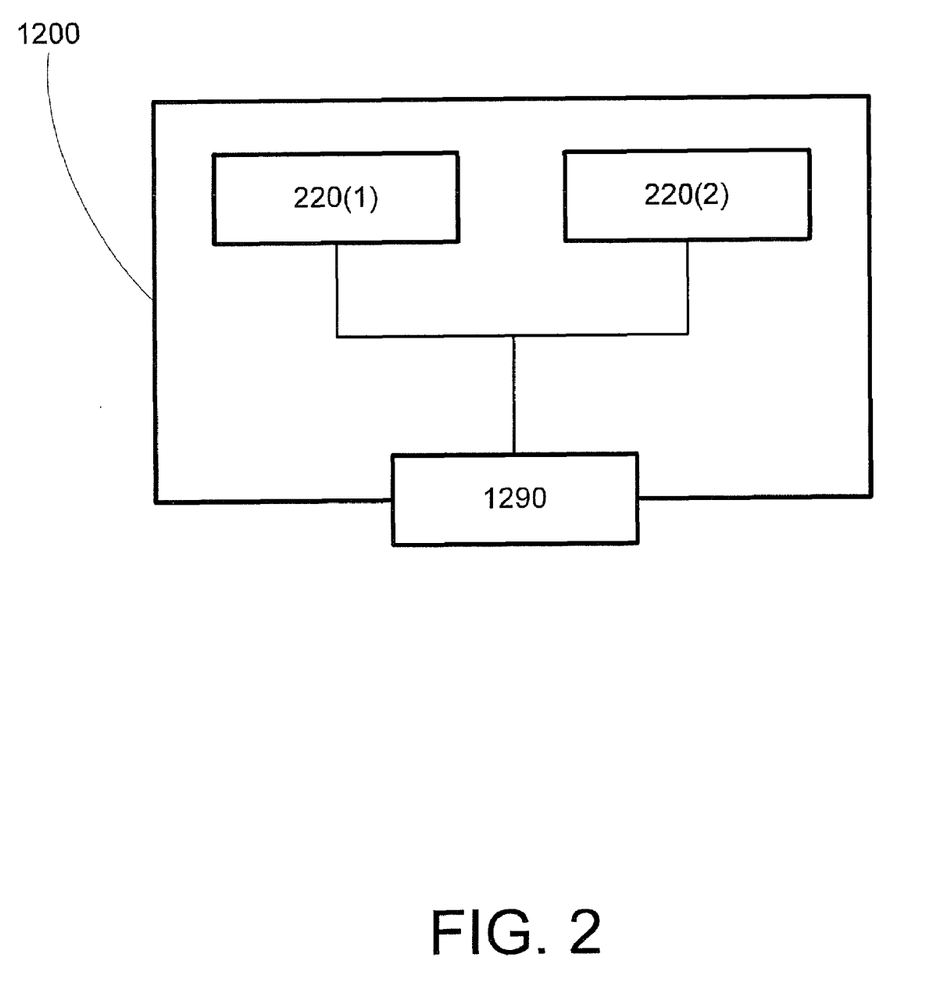
FIG. 2 illustrates a system for inspecting an object, according to an embodiment of the invention.

FIG. 2 illustrates system 1200 for inspecting an object, according to an embodiment of the invention.

System 1200 includes interface 1290 for receiving from an external camera image information that includes first image information that pertains to a first image that is an image comprising color information of a first band of an optical spectrum (e.g. red color information) and second image information that pertains to a second image that is an image comprising color information of a second band of the optical spectrum (e.g. green color information), wherein the first image and the second image cover substantially the same area.

According to an embodiment of the invention, the first image information and the second image information are both part of an image information of a single image, and pertains to different colors of which (e.g. in a RGB camera). It is noted that the first image information and the second image information are acquired substantially parallelly (i.e. at least partly concurrently).

System 1200 further includes one or more processors 1220 configured to process first image information so as to detect first type defects, and to process second image information so as to detect second type defects, wherein it is noted that, according to different embodiments of the invention, each type of image information may be used to detect more than a single type of defect.

It is noted that system 1200 may be used in an automatic final inspection system, carrying out a last stage in a process of inspection. System 1200 may be used in an automated optical inspection system.

According to an embodiment of the invention, system 1200 (and especially the one or more processors 1220) may be configured to generate a defect alert and/or a defect report, in response to results of the processing of the different images.

According to an embodiment of the invention, the one or more processors 1220 are adapted to parallelly process image information of the first image and of the second image. It is noted that, according to an embodiment of the invention, the one or more processors 1220 are adapted to process image information that is received from the external camera, to provide the first and the second image information (e.g. if the external camera provides image information of a color image including both the first and the second bands of the optical spectrum).

Figure 3:
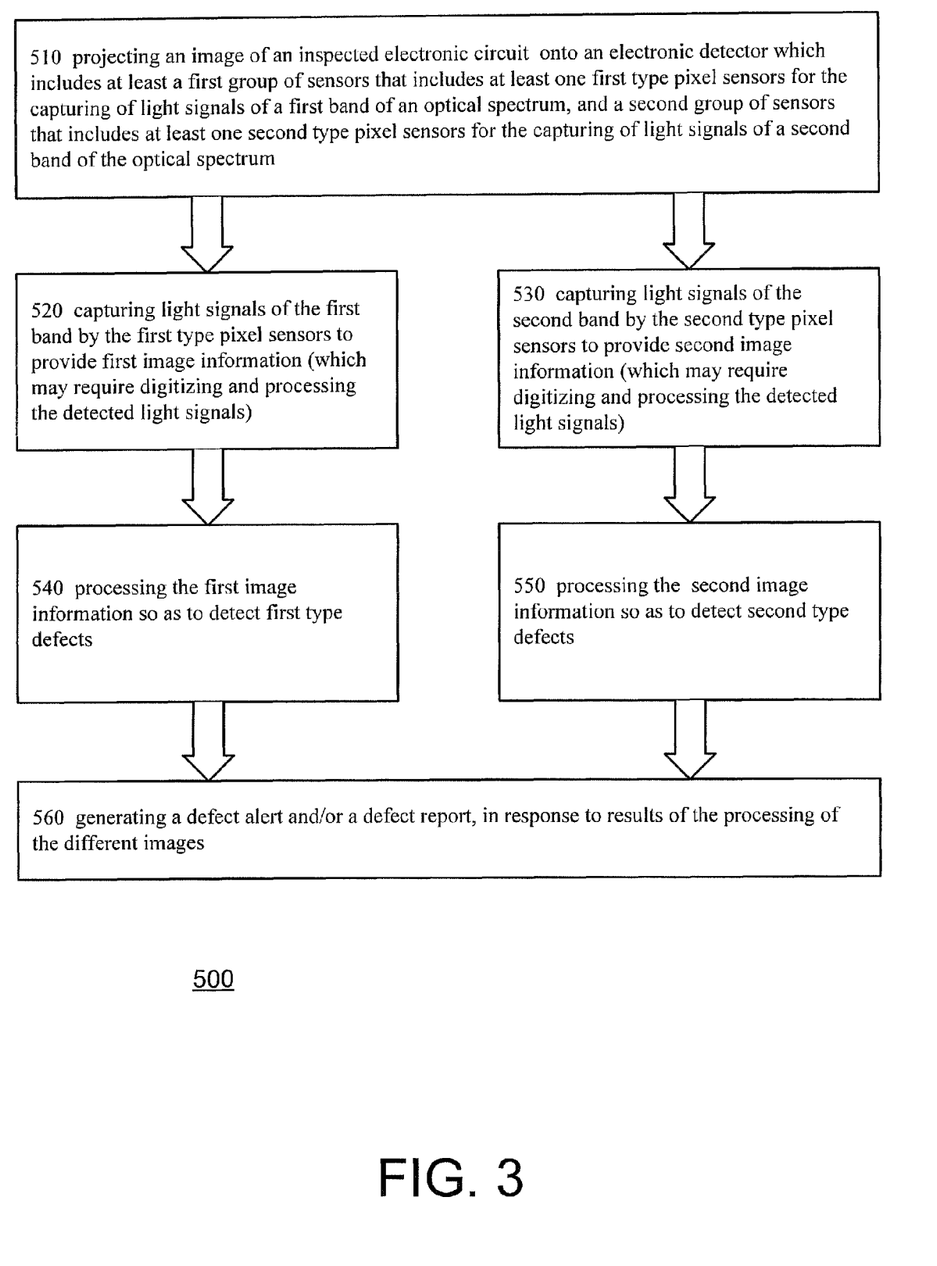
FIG. 3 illustrates a method for inspecting an object, according to an embodiment of the invention.

FIG. 3 illustrates method 500 for electronic circuit scanning, according to an embodiment of the invention.

Method 500 conveniently starts with stage 510 of projecting an image of an inspected electronic circuit (such as a PCB, or an IE) onto an electronic detector which includes at least a first group of sensors that includes at least one first type pixel sensors for the capturing of light signals of a first band of an optical spectrum, and a second group of sensors that includes at least one second type pixel sensors for the capturing of light signals of a second band of the optical spectrum.

Stage 510 is followed by stage 520 of capturing light signals of the first band by the first type pixel sensors to provide first image information (which may require digitizing and processing the detected light signals), and stage 530 of capturing light signals of the second band by the second type pixel sensors to provide second image information (which may require digitizing and processing the detected light signals), wherein stage 520 and 530 are conveniently carried out substantially parallelly (i.e. at least partly concurrently), wherein the first image information pertains to image information of a first image which is respective to light signals detected by first type pixel sensors, and the second image information pertains to image information of a second image which is respective to light signals detected by second type pixel sensors, wherein the first image and the second images are images of substantially the same area.

It is noted that the optical spectrum may be limited to the visible optical spectrum, or may extend to other parts of the optical spectrum, such as infra red. The first and the second band may be referred to as a color (e.g. red light, green light), but this is not necessarily so. Further more, each of the types of pixel sensors may be adapted to detect light substantially from the respective band of the optical spectrum, or alternatively, the light arriving from the optical section may be filtered before arriving to different pixel sensors (e.g. red filters will filter light that is directed to red band pixel sensors, and so forth).

Stages 520 and 530 are followed by stage 540 of processing the first image information so as to detect first type defects, and by stage 550 of processing the second image information so as to detect second type defects, wherein stages 540 and 550 may be carried out substantially in parallel, serially, or in other temporal relation, according to different embodiments of the invention. It is noted that, according to different embodiments of the invention, each type of image information may be used to detect more than a single type of defect. For example, in printed circuit boards (PCB), a red image information may be processed to detect defects in metal components (e.g. copper, gold), and a green or white image information may be processed to detect defects in a solder mask, and to evaluate coverage. It is noted that method 500 may be used for detecting defects in different types of electronic circuits, such as PCBs, integrated circuits, and so forth.

According to an embodiment of the invention, method 500 further includes stage 560 of generating a defect alert and/or a defect report, in response to results of the processing of the different images.

Referring to the examples set forward in the previous figures, method 500 may be carried out by system 10.

Figure 4:
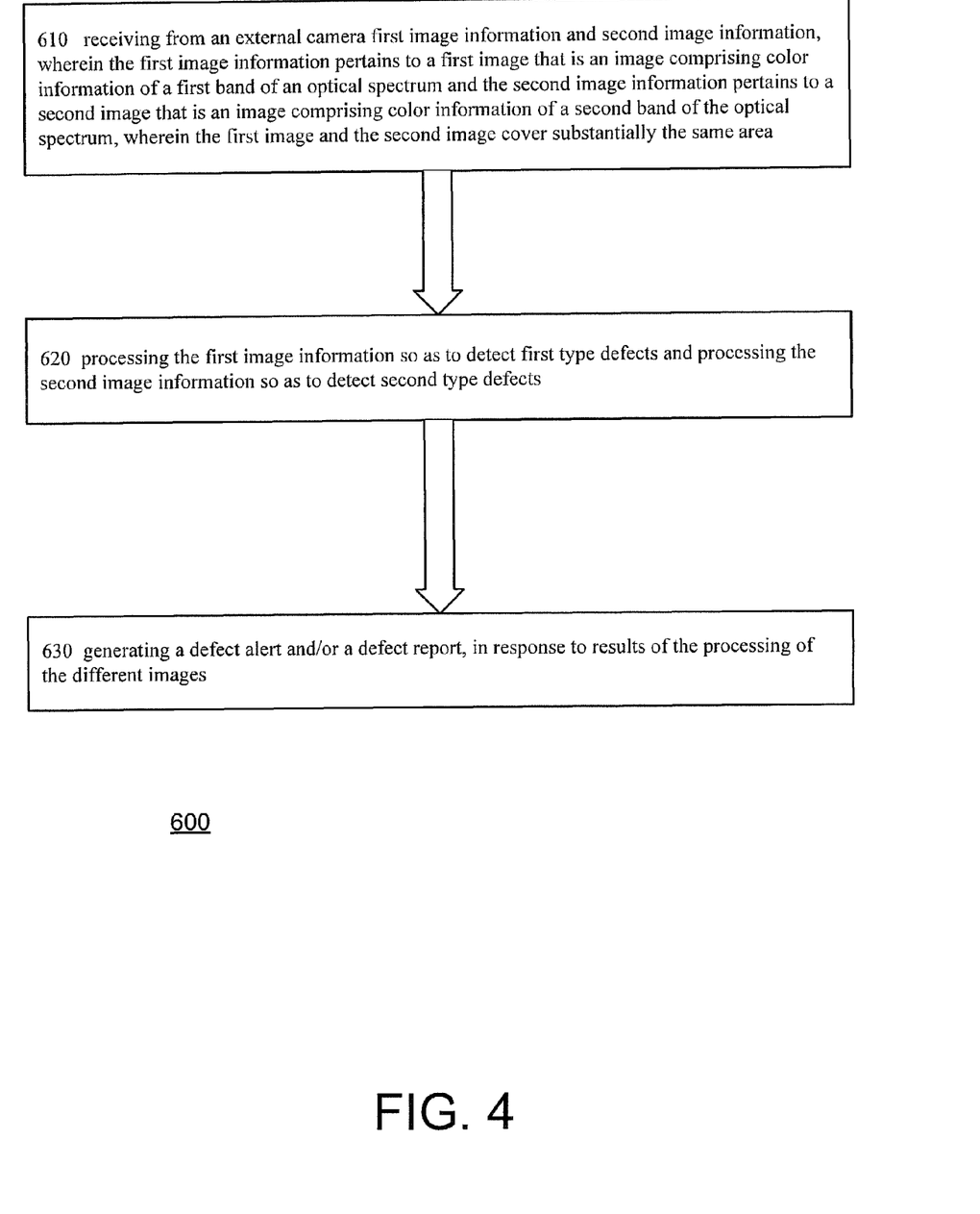
FIG. 4 illustrates a system for inspecting an object, according to an embodiment of the invention.

FIG. 4 illustrates method 600 for electronic circuit scanning, according to an embodiment of the invention.

Method 600 conveniently starts with stage 610 receiving from an external camera first image information and second image information, wherein the first image information pertains to a first image that is an image comprising color information of a first band of an optical spectrum (e.g. red color information) and the second image information pertains to a second image that is an image comprising color information of a second band of the optical spectrum (e.g. green color information), wherein the first image and the second image cover substantially the same area. It is noted that conveniently the first image and the second image are obtained by the external camera substantially in parallel.

Stage 610 is followed by stage 620 of processing the first image information so as to detect first type defects and processing the second image information so as to detect second type defects, wherein the processing of the first image information and the processing of the second image information may be carried out substantially in parallel, serially, or in other temporal relation, according to different embodiments of the invention. It is noted that, according to different embodiments of the invention, each type of image information may be used to detect more than a single type of defect. For example, in printed circuit boards (PCB), a red image information may be processed to detect defects in metal components (e.g. copper, gold), and a green or white image information may be processed to detect defects in a solder mask, and to evaluate coverage. It is noted that method 600 may be used for detecting defects in different types of electronic circuits, such as PCBs, integrated circuits, and so forth.

According to an embodiment of the invention, method 600 further includes stage 630 of generating a defect alert and/or a defect report, in response to results of the processing of the different images.

Referring to the examples set forward in the previous figures, method 600 may be carried out by system 1200.

Figure 5:
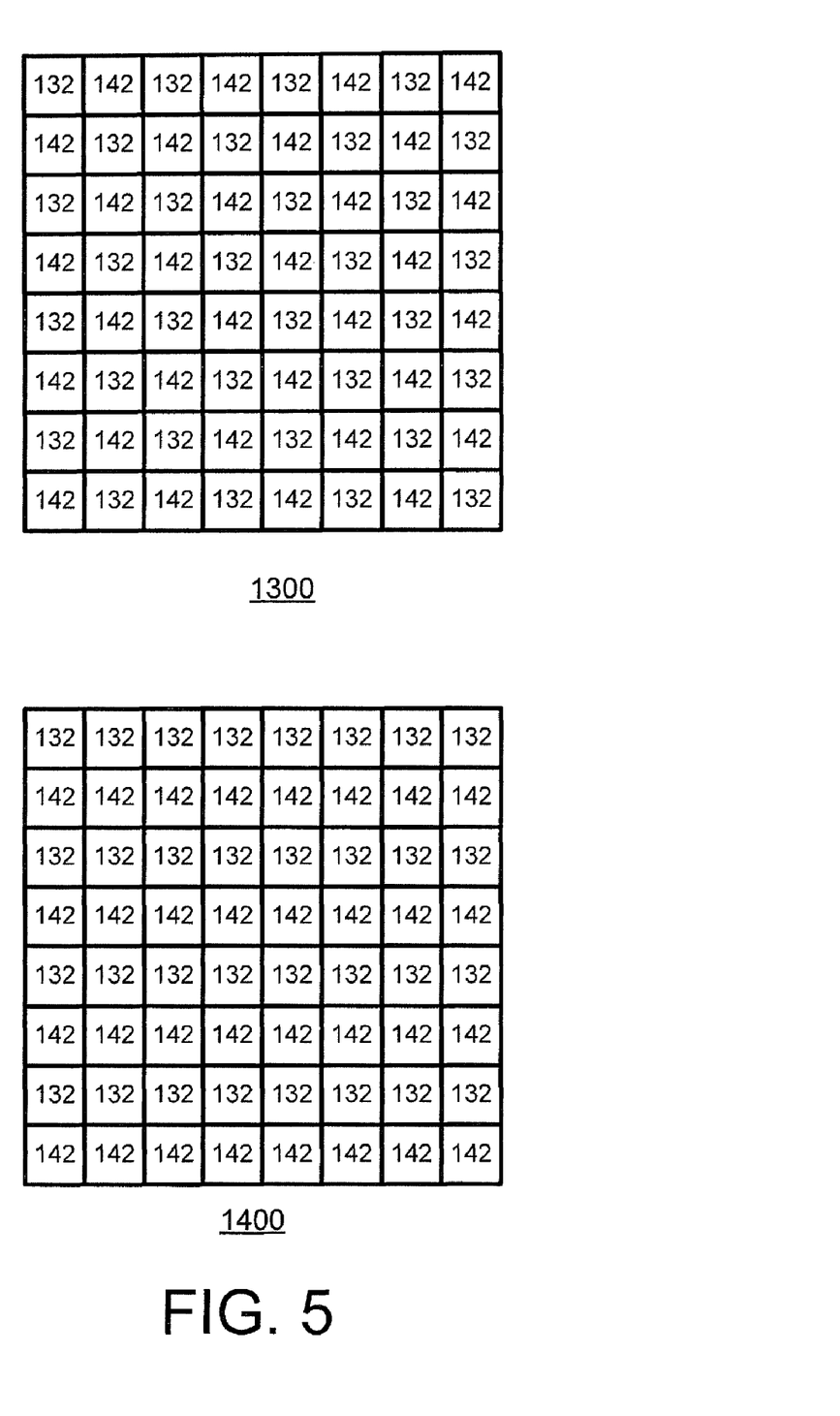
FIG. 5 illustrates various arrangements of sensors according to various embodiments of the invention.

FIG. 5 illustrates various arrangements of sensors according to various embodiments of the invention.

Array 1300 includes first type pixel sensors 132 and second type pixel sensors 142 that are arranged in an interlaced manner to form a two dimensional sensor array. Each row of the array includes both pixel sensors of a first type 132 and pixel sensors of a second type 142. Each first type pixel 132 is surrounded by four second type pixel sensors 142. Each second type pixel 142 is surrounded by four first type pixel sensors 132.

A pixel sensor is a sensor that its detection signals may affect a pixel of an image that may be reconstructed by the processing unit.

Array 1400 includes dedicated rows of first type pixel sensors 132 and dedicated rows of second type pixel sensors 142. Each row of first type pixel sensors 132 is surrounded by two rows of second type pixel sensors 142.

The present invention can be practiced by employing conventional tools, methodology and components. Accordingly, the details of such tools, component and methodology are not set forth herein in detail. In the previous descriptions, numerous specific details are set forth, in order to provide a thorough understanding of the present invention. However, it should be recognized that the present invention might be practiced without resorting to the details specifically set forth.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

We claim:

1. An inspection system, comprising:
a first group of sensors, for sensing light components of a first light band of an image of an area of an inspected object, and for generating first detection signals reflecting sensed light components of the first light band;
a second group of sensors, for sensing light components of a second light band of the image of the area of the inspected object, and for generating second detection signals reflecting sensed light components of the second light band,
wherein the second light band differs from the first light band,
wherein the second group of sensors is arranged to sense the light components of the second light band while the first group of sensors senses the light components of the first light band;
optics, for projecting the image of the area of the inspected object towards the first group of sensors and towards the second array of sensors; and
a processing unit, coupled to the first and second group of sensors, for detecting a first type of defects based on the first detection signals and for detecting a second type of defects based on the second detection signals.

2. The inspection system according to claim 1, wherein the processing unit is arranged to detect defects of at least one additional type of defects based on the first detection signals.

3. The inspection system according to claim 1, wherein the processing unit is arranged to correlate between the first and second detection signals.

4. The inspection system according to claim 1, wherein the sensors of the first group of sensors are arranged to detect red light components and sensors of the second group of sensors are arranged to detect green light components.

5. The inspection system according to claim 4, wherein the processing unit is arranged to detect defects in metal components of the inspected object by processing the first detection signals to detect, and wherein the processing unit is arranged to detect defects in a solder mask by processing the second detection signals.

6. The inspection system according to claim 1, wherein the sensors of the first group of sensors are arranged to detect infra red light components and sensors of the second group of sensors are arranged to detect visible light components.

7. The inspection signals according to claim 1, wherein the first and second groups of sensors are arranged in an interlacing manner.

8. The inspection system according to claim 1, wherein the first and second groups of sensors are spaced apart from each other.

9. The inspection system according to claim 1, wherein the first group of sensors comprises pixel sensors of a first type that differs from a second type of pixel sensors of the second group of pixels.

10. The inspection system according to claim 1, wherein the first group of sensors is preceded by a first filter that filters light components of the first light band; and wherein the second group of sensors is preceded by a second filter that filters light components of the second light band.

11. The inspection system according to claim 1, wherein the first and second groups of sensors are arranged to generate the first and second detection signals in parallel and wherein the processing unit is arranged to generate process the first and second detection signals in parallel.

12. The inspection system according to claim 1, wherein the processing unit is arranged to receive the first or second detection signals over a wireless link.

13. The inspection system according to claim 1, wherein the inspected image is a printed circuit board.

14. The inspection system according to claim 1, further comprising a stage for moving the inspected object in relation to the optics so that the optics projects, at different point in time, different images of different area of the inspected object towards the first and second groups of sensors.

15. An inspection system, comprising:
an interface, for receiving first detection signals and second detection signals;
wherein the first detection signals are generated by first group of sensors and represent light components of a first light band of an image of an area of an inspected object;

wherein the second detection signals are generated by second group of sensors and represent light components of a second light band of the image of the area of the inspected object; and a processing unit, coupled to the interface, for detecting a first type of defects based on the first detection signals and for detecting a second type of defects based on the second detection signals.

16. A method for inspecting an object, the method comprises:

projecting an image of an area of the inspected object towards a first group of sensors and towards a second array of sensors;

sensing, by the first group of sensors, light components of a first light band of the image of the area of the inspected object;

generating, by the first group of sensors, first detection signals that reflect sensed light components of the first light band;

sensing, by a second group of sensors and in parallel to the sensing by the first group of sensors, light components of a second light band of the image of the area of an inspected object;

generating, by the second group of sensors, second detection signals that reflect sensed light components of the second light band; and detecting, by a processing unit, a first type of defects based on the first detection signals and detecting, by the processor unit, a second type of defects based on the second detection signals.

17. The method according to claim 16, comprising detecting defects of at least one additional type of defects based on the first detection signals.

18. The method according to claim 16, comprising correlating between the first and second detection signals.

19. The method according to claim 16, comprising detecting by the sensors of the first group of sensors red light components, and detecting by the sensors of the second group of sensors green light components.

20. The method according to claim 19, comprising detecting defects in metal components of the inspected object by processing the first detection signals, and detecting defects in a solder mask by processing the second detection signals.

21. The method according to claim 16, comprising sensing by the sensors of the first group of sensors infra red light components, and sensing by the sensors of the second group of sensors visible light components.

22. A method for inspecting an object, the method comprises:

receiving first detection signals and second detection signals;

wherein the first detection signals are generated by first group of sensors and represent light components of a first light band of an image of an area of an inspected object;

wherein the second detection signals are generated by second group of sensors and represent light components of a second light band of the image of the area of the inspected object; and detecting a first type of defects based on the first detection signals and detecting a second type of defects based on the second detection signals detecting defects based on the first or second detection signals.

* * * * *